United States Patent
Godo et al.

(10) Patent No.: US 11,984,832 B2
(45) Date of Patent: May 14, 2024

(54) DRIVE AXLE SYSTEM AND METHOD OF CONTROL

(71) Applicant: ArvinMeritor Technology, LLC, Troy, MI (US)

(72) Inventors: Edvin Godo, Troy, MI (US); Banuchandar Muthukumar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/954,484

(22) Filed: Sep. 28, 2022

(65) Prior Publication Data

US 2024/0106380 A1   Mar. 28, 2024

(51) Int. Cl.
| | |
|---|---|
| *G05B 5/00* | (2006.01) |
| *B60L 15/20* | (2006.01) |
| *H02P 23/14* | (2006.01) |
| *H02P 29/60* | (2016.01) |
| *B60K 7/00* | (2006.01) |
| *B60K 17/36* | (2006.01) |

(52) U.S. Cl.
CPC .............. *H02P 29/60* (2016.02); *B60L 15/20* (2013.01); *H02P 23/14* (2013.01); *B60K 7/0007* (2013.01); *B60K 17/36* (2013.01); *B60L 2240/423* (2013.01); *B60L 2240/425* (2013.01); *B60L 2240/463* (2013.01)

(58) Field of Classification Search
CPC .......... H02P 29/60; H02P 23/14; H02P 29/64; H02P 29/02; H02P 29/032; H02P 29/68; H02P 29/06; B60K 7/007; B60L 15/20; B60L 2240/433; B60L 2240/425; B60L 2240/403

See application file for complete search history.

(56) References Cited

U.S. PATENT DOCUMENTS

| | | |
|---|---|---|
| 10,889,205 B2 | 1/2021 | Hettrich et al. |
| 10,989,288 B1 | 4/2021 | Ghatti et al. |
| 11,002,352 B2 | 5/2021 | Ghatti et al. |
| 11,038,396 B2 | 6/2021 | Raya et al. |
| 11,207,976 B2 | 12/2021 | Ghatti et al. |
| 11,209,072 B2 | 12/2021 | Ghatti et al. |
| 11,220,176 B1 | 1/2022 | Cradit et al. |
| 2011/0213518 A1 | 9/2011 | Welchko et al. |
| 2014/0117909 A1 | 5/2014 | Kim et al. |

(Continued)

FOREIGN PATENT DOCUMENTS

| | | | | |
|---|---|---|---|---|
| JP | 2002238278 A | * | 8/2002 | .............. H02P 21/32 |
| JP | 2006148991 A | | 6/2006 | |
| KR | 20120047144 A | * | 5/2012 | |

OTHER PUBLICATIONS

Cradit et al., U.S. Appl. No. 17/308,307, filed May 5, 2021, 46 pages.

(Continued)

*Primary Examiner* — Karen Masih
(74) *Attorney, Agent, or Firm* — Brooks Kushman PC

(57) ABSTRACT

A drive axle system and a method of control. A control system determines a torque command based on an inverter temperature, a stator temperature of a stator of an electric motor, and a rotor temperature of a rotor of the electric motor. The electric motor is operated to provide torque based on the torque command.

19 Claims, 3 Drawing Sheets

(56) References Cited

U.S. PATENT DOCUMENTS

2020/0228049 A1   7/2020  Yoo et al.
2021/0291646 A1   9/2021  Lorenz et al.
2022/0169237 A1*  6/2022  Hu ........................ B60L 15/209

OTHER PUBLICATIONS

Extended European Search Report dated Feb. 28, 2024, for related European Appln. No. 23197263.9; 10 Pages.

* cited by examiner

DRIVE AXLE SYSTEM AND METHOD OF CONTROL

TECHNICAL FIELD

This relates to a drive axle system and a method of control that is associated with derating or limiting electric motor torque based on temperature.

BACKGROUND

A driving motor for an electric vehicle having a motor control unit that performs temperature-based control is disclosed in U.S. Patent Publication No. 2014/0117909.

SUMMARY

A method of controlling a drive axle system is provided. The method includes determining an inverter temperature of an inverter of the drive axle system, a stator temperature of a stator of an electric motor of the drive axle system, and a rotor temperature of a rotor of the electric motor. The method includes determining a torque command based on the inverter temperature, the stator temperature, and the rotor temperature. The electric motor is operated to provide torque to a wheel of the drive axle system based on the torque command.

Determining the torque command may include limiting a peak torque and a continuous torque that is provided but with the electric motor. The peak torque and the continuous torque may be limited when the inverter temperature exceeds a first inverter temperature threshold. The peak torque and the continuous torque may be limited when the stator temperature exceeds a first stator temperature threshold. The peak torque and the continuous torque may be limited when the rotor temperature exceeds a first rotor temperature threshold. The first stator temperature threshold may be greater than the first rotor temperature threshold. The first rotor temperature threshold may be greater than the first inverter temperature threshold.

Limiting the peak torque and the continuous torque may include determining a derating value. The derating value may be based on the inverter temperature, the stator temperature, and the rotor temperature. The peak torque and the continuous torque may be derated based on the derating value.

The peak torque and the continuous torque may be derated nonlinearly as the inverter temperature increases when the inverter temperature exceeds the first inverter temperature threshold and does not exceed a second inverter temperature threshold. The peak torque and the continuous torque may be derated nonlinearly as the stator temperature increases when the stator temperature exceeds the first stator temperature threshold and does not exceed the second stator temperature threshold. The peak torque and the continuous torque may be derated nonlinearly as the rotor temperature increases when the rotor temperature exceeds the first rotor temperature threshold and does not exceed a second rotor temperature threshold.

The second stator temperature threshold may be greater than or equal to the second rotor temperature threshold. The second rotor temperature threshold may be greater than the second inverter temperature threshold. The first stator temperature threshold may be greater than or equal to the second rotor temperature threshold. The first rotor temperature threshold may be greater than or equal to the second inverter temperature threshold.

A maximum available torque from the electric motor may be the continuous torque when the inverter temperature is equal to the second inverter temperature threshold, the stator temperature is less than the second stator temperature threshold, and the rotor temperature is less than the second rotor temperature threshold.

The maximum available torque from the electric motor may be the continuous torque when the stator temperature is equal to the second stator temperature threshold, the inverter temperature is less than the second inverter temperature threshold, and the rotor temperature is less than the second rotor temperature threshold.

The maximum available torque from the electric motor may be the continuous torque when the rotor temperature is equal to the second rotor temperature threshold, the inverter temperature is less than the second inverter temperature threshold, and the stator temperature is less than the second stator temperature threshold.

The maximum available torque from the electric motor may be the peak torque when the inverter temperature is equal to the first inverter temperature threshold, the stator temperature is less than the second stator temperature threshold, and the rotor temperature is less than the second rotor temperature threshold. The maximum available torque from the electric motor may be the continuous torque when the inverter temperature is equal to the second inverter temperature threshold, the stator temperature is less than the second stator temperature threshold, and the rotor temperature is less than the second rotor temperature threshold.

The maximum available torque from the electric motor may be the peak torque when the stator temperature is equal to the first stator temperature threshold, the inverter temperature is less than the second inverter temperature threshold, and the rotor temperature is less than the second rotor temperature threshold. The maximum available torque from the electric motor may be the continuous torque when the stator temperature is equal to the second stator temperature threshold, the inverter temperature is less than the second inverter temperature threshold, and the rotor temperature is less than the second rotor temperature threshold.

The maximum available torque from the electric motor may be the peak torque when the rotor temperature is equal to the first rotor temperature threshold, the inverter temperature is less than the second inverter temperature threshold, and the stator temperature is less than the second stator temperature threshold. The maximum available torque from the electric motor may be the continuous torque when the rotor temperature is equal to the second rotor temperature threshold, the inverter temperature is less than the second inverter temperature threshold, and the stator temperature is less than the second stator temperature threshold.

Determining the torque command includes not derating the peak torque or the continuous torque that is provided but with the electric motor when the inverter temperature does not exceed the first inverter temperature threshold, the stator temperature does not exceed the first stator temperature threshold, and the rotor temperature does not exceed the first rotor temperature threshold.

A drive axle system is provided. The drive axle system includes an axle assembly, an electric power source, an inverter, and a control system. The axle assembly rotatably supports a wheel. The axle assembly has an electric motor. The electric motor is operatively connected to the wheel. The electric motor includes a stator and a rotor. The rotor is rotatable with respect to the stator. The electric power source is electrically connected to the electric motor via the inverter. The control system is configured to control torque that is provided to the wheel by the electric motor. The control system is configured to control torque based on an inverter temperature of the inverter, a stator temperature of the stator, and a rotor temperature of the rotor.

The control system may limit a peak torque and a continuous torque that is provided with the electric motor when the inverter temperature exceeds a first inverter temperature threshold, the stator temperature exceeds a first stator temperature threshold, or the rotor temperature exceeds a first rotor temperature threshold. The control system may limit a maximum available torque that is provided with the electric motor to not exceed the continuous torque when the inverter temperature exceeds a second inverter temperature threshold, the stator temperature exceeds a second stator temperature threshold, or the rotor temperature exceeds a second rotor temperature threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
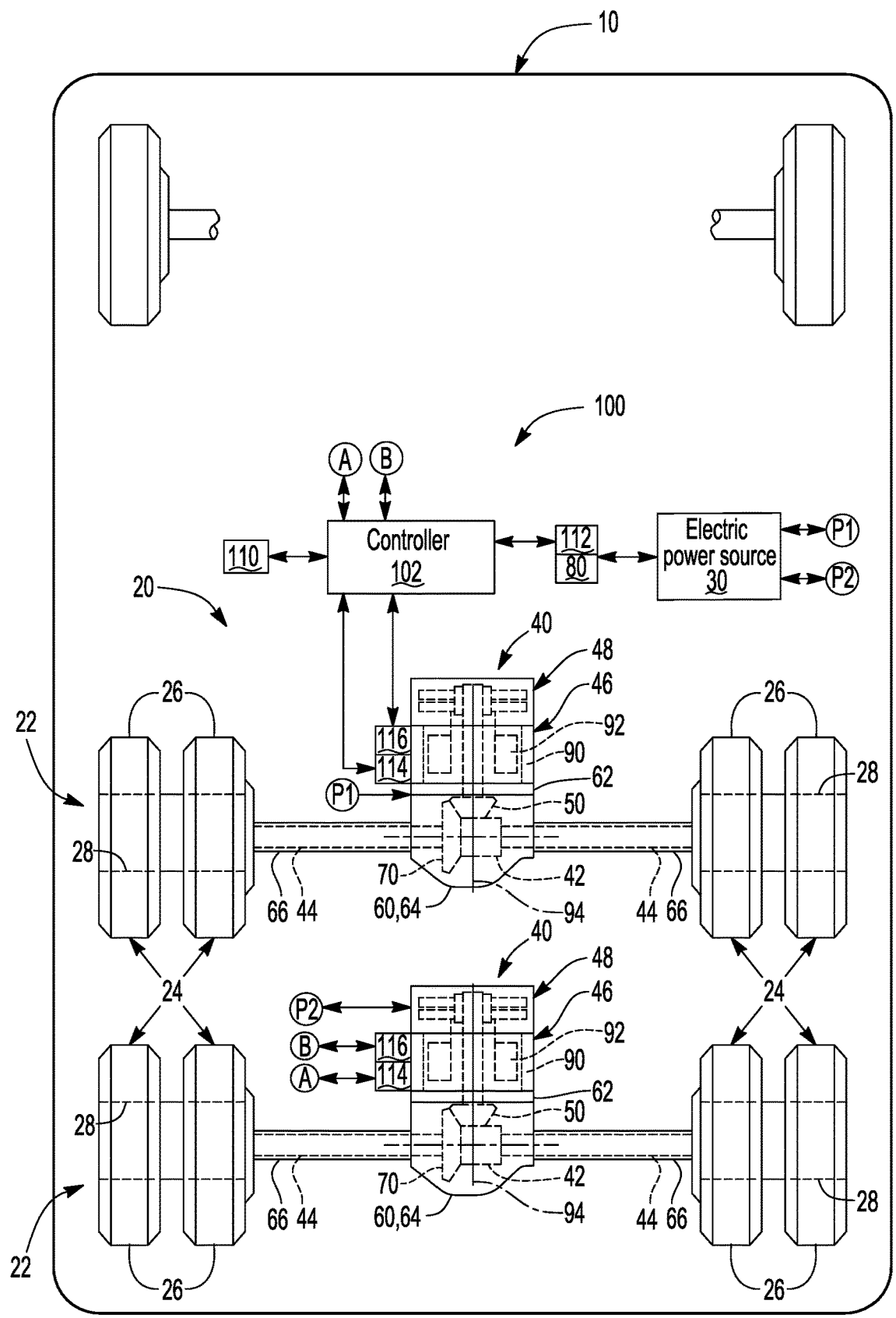
FIG. 1 is a schematic representation of a vehicle having a drive axle system that includes at least one axle assembly.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may include a drive axle system 20.

The drive axle system 20 includes one or more axle assemblies 22, such as a front axle assembly and a rear axle assembly. The axle assemblies 22 are illustrated as drive axle assemblies. A drive axle assembly may be configured to provide torque to one or more wheel assemblies 24 that may be rotatably supported on the axle assembly 22. A wheel assembly 24 may include a tire 26 disposed on a wheel 28. The drive axle system 20 may also include or be associated with at least one electric power source 30, such as an electrical energy storage device like a battery.

In at least one configuration, the front axle assembly 22 and the rear axle assembly 22 may generally be disposed near each other and may be positioned toward the rear of the vehicle 10, similar to a conventional tandem axle arrangement. However, unlike a conventional tandem axle arrangement, the front axle assembly 22 and the rear axle assembly 22 are not operatively connected to each other and do not receive torque from the same electric motor. As such, the front axle assembly 22 and the rear axle assembly 22 are not connected in series with each other with a shaft, such as a prop shaft that may connect an output of the front axle assembly 22 with an input of the rear axle assembly 22. It is also contemplated that the front axle assembly 22 and the rear axle assembly 22 may be arranged in a different manner, such as with either or both axle assemblies being disposed near the front of the vehicle.

The front axle assembly and the rear axle assembly may have similar or identical configurations. In the configuration shown, both axle assemblies include a housing assembly 40, a differential assembly 42, a pair of axle shafts 44, an electric motor 46, a transmission 48, and a drive pinion 50. In addition, a friction brake may be associated with each wheel assembly 24. The positioning of the differential assembly 42, the electric motor 46, and/or the transmission 48 may differ from that shown. For instance, the differential assembly 42 may be positioned between the electric motor 46 and the transmission 48.

The housing assembly 40 receives various components of the axle assembly 22. In addition, the housing assembly 40 may facilitate mounting of the axle assembly 22 to the vehicle 10. In at least one configuration, the housing assembly 40 may include an axle housing 60 and a differential carrier 62.

The axle housing 60 may receive and support the axle shafts 44. In at least one configuration, the axle housing 60 may include a center portion 64 and at least one arm portion 66.

The center portion 64 may be disposed proximate the center of the axle housing 60. The center portion 64 may define a cavity that may receive the differential assembly 42.

One or more arm portions 66 may extend from the center portion 64. For example, two arm portions 66 may extend in opposite directions from the center portion 64 and away from the differential assembly 42. The arm portions 66 may each have a hollow configuration or tubular configuration that may extend around and may receive a corresponding axle shaft 44 and may help separate or isolate the axle shaft 44 from the surrounding environment. A wheel hub may be rotatably disposed on an arm portion 66 and operatively connected to an axle shaft 44. A wheel assembly 24 is mountable to the wheel hub.

The differential carrier 62 may be mounted to the center portion 64 of the axle housing 60. The differential assembly 42 may be rotatably supported on the differential carrier 62.

The differential assembly 42 is disposed in the housing assembly 40. For instance, the differential assembly 42 may be disposed in the center portion 64 of the axle housing 60. The differential assembly 42 may transmit torque to the axle shafts 44 of the axle assembly 22 and permit the axle shafts 44 and wheel assemblies 24 to rotate at different velocities in a manner known by those skilled in the art. For example, the differential assembly 42 may have a ring gear 70 that may be fixedly mounted on a differential case. The ring gear 70 and the differential case may be rotatable about a differential axis. The differential case may receive differential gears that may be operatively connected to the axle shafts 44.

The axle shafts 44 are configured to transmit torque between the differential assembly 42 and a corresponding wheel hub. For example, two axle shafts 44 may be provided such that each axle shaft 44 extends through a different arm portion 66 of axle housing 60. The axle shafts 44 may be rotatable about an axis, such as a wheel axis or the differential axis.

The electric motor 46 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce, limit, or prevent vehicle rollback, such as when the vehicle 10 is on an inclined surface. Regenerative braking may provide a regenerative braking torque, which may also be referred to as regenerative brake torque or regenerative torque. Regenerative braking may capture kinetic energy when the electric motor 46 is used to brake or slow the velocity of the vehicle 10. Recovered energy may be transmitted from the wheel assemblies 24 to drive the electric motor 46. Thus, the electric motor 46 may function as a generator and may be used to charge the electric power source 30. The electric motor 46 may be electrically connected to the electric power source 30 via an inverter 80 in a manner known by those skilled in the art.

An example of electrical connections between the front axle assembly 22 and the rear axle assembly 22 and the electric power source 30 are represented with connection symbols P1 and P2, respectively. In the example shown, the electric power source 30 is electrically connected to both axle assemblies 22; however, it is contemplated that each axle assembly 22 may be electrically connected to a different electric power source 30. For instance, a first power source may be electrically connected to a first axle assembly but not to a second axle assembly while a second power source may be electrically connected to the second axle assembly but not to the first axle assembly.

The electric motor 46 may be mounted to or positioned inside of the housing assembly 40. The electric motor 46 includes a stator 90 and a rotor 92. The stator 90 may be fixedly positioned with respect to the housing assembly 40. The stator 90 may encircle the rotor 92. The rotor 92 is rotatable about an axis 94 with respect to the stator 90.

The transmission 48 facilitates the transmission of torque between the electric motor 46 and the drive pinion 50. Torque transmission may be bidirectional. The transmission 48 may provide gear reduction and multiple gear ratios between the rotor 92 and the drive pinion 50. The transmission 48 may be of any suitable type. For instance, the transmission 48 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein.

The drive pinion 50 operatively connects the differential assembly 42 and the transmission 48. The drive pinion 50 may be received in the housing assembly 40 and may transmit torque between the differential assembly 42 and the transmission 48. The drive pinion 50 may be rotatable about an axis, such as the axis 94, and may have a gear portion that has teeth that meshes with teeth of the ring gear 70 of the differential assembly 42. Torque that is provided by the electric motor 46 to the transmission 48 and to the drive pinion 50 may be transmitted to the ring gear 70 and thus to the differential assembly 42.

A control system 100 controls operation of the drive axle system 20. For example, the control system 100 may include one or more microprocessor-based control modules or controllers 102 that may be electrically connected to or communicate with components of the vehicle 10 and/or the axle assembly 22, such as the electric motor 46, the inverter 80, etc. Control system connections are represented by the double arrowed lines in FIG. 1 as well as by connection symbols A and B. The control system 100 may also monitor and control the electric power source 30 and thus may control torque that is provided with the electric motor 46. In addition, the control system 100 may also process input signals or data from various input devices or sensors. These input devices may include an accelerator pedal position sensor 110, an inverter temperature sensor 112, a stator temperature sensor 114, and a rotor temperature sensor 116.

The accelerator pedal position sensor 110 provides a signal that is indicative of the position of an accelerator pedal. For example, the accelerator pedal position sensor 110 may provide a signal that is indicative of a request for acceleration the vehicle 10. The signal provided by the accelerator pedal position sensor 110 is referred to as a torque request signal and may be used by the controller 102 as in input that is used control the torque that is provided by the electric motor 46. For instance, the controller 102 may control the electric motor 46 to provide propulsion torque or regeneration torque based on the torque request signal from the accelerator pedal position sensor 110. It is also contemplated that an autonomous driving system or a vehicle cruise control system may provide the torque request signal.

The accelerator pedal may be operated or actuated by a driver or operator of the vehicle 10 to request acceleration and deceleration of the vehicle 10. The accelerator pedal may have any suitable configuration. For example, the accelerator pedal may be a foot-operated pedal that may be mounted near the floor of the passenger compartment of the vehicle 10 or may be a hand-operated pedal that may be provided in another location, such as proximate a steering wheel or control console of the vehicle 10.

The accelerator pedal may be moveable between a first position and a second position. The first position may be a released position in which the accelerator pedal is not actuated or depressed by the driver. The first position may correspond with a 0% pedal position when expressed as a percentage. The second position may be a fully actuated or "full throttle" position in which the accelerator pedal 112 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage.

It is also contemplated that a single pedal may provide a signal or signals indicative of a request for acceleration or a request for deceleration rather than separate accelerator and brake pedals. Such a configuration in referred to as a "one-pedal" driving system. Thus, the term accelerator pedal also encompasses one-pedal driving system in which a single pedal can be used to request acceleration and deceleration of the vehicle.

The inverter temperature sensor 112 provides a signal indicative of the temperature of the inverter 80. In FIG. 1, the inverter temperature sensor 112 is illustrated as being located adjacent to the inverter 80 for clarity; however, the inverter temperature sensor 112 may be located inside or outside of the inverter 80. The inverter temperature sensor 112 may directly or indirectly detect the temperature of the inverter 80. For instance, inverter temperature sensor 112 may directly detect the inverter temperature, such as when the inverter temperature sensor 112 is disposed on or integrated with the inverter 80. The inverter temperature sensor 112 may indirectly detect the inverter temperature by detecting the temperature of coolant that circulates through the inverter 80 or through a coolant jacket or other heat exchanger to cool the inverter 80. It is also contemplated that the temperature of the inverter 80 may be estimated by the controller 102 rather than directly measured or detected. Thus, the term inverter temperature sensor as used herein encompasses directly detecting inverter temperature, detecting inverter temperature indirectly, and estimating the inverter temperature.

The stator temperature sensor 114 provides a signal indicative of the temperature of the stator 90 of the electric motor 46. In FIG. 1, the stator temperature sensor 114 is illustrated as being located outside of the electric motor 46 for clarity; however, the stator temperature sensor 114 may be located inside the electric motor 46 adjacent to or within the stator 90. The stator temperature sensor 114 may directly or indirectly detect the temperature of the stator 90. For instance, stator temperature sensor 114 may directly detect the stator temperature, such as when the stator temperature sensor 114 is disposed on or integrated with the stator 90. The stator temperature sensor 114 may indirectly detect the stator temperature by detecting the temperature of coolant that circulates through a coolant jacket that cools the stator 90. It is also contemplated that the temperature of the stator 90 may be estimated by the controller 102 rather than directly measured or detected. Thus, the term stator temperature sensor as used herein encompasses directly detecting stator temperature, detecting stator temperature indirectly, and estimating the stator temperature.

The rotor temperature sensor 116 provides a signal indicative of the temperature of the rotor 92 of the electric motor 46. In FIG. 1, the rotor temperature sensor 116 is illustrated as being located outside of the electric motor 46 for clarity; however, the rotor temperature sensor 116 may be located inside the electric motor 46 adjacent to or within the rotor 92. It is also contemplated that the temperature of the rotor 92 may be estimated by the controller 102 rather than directly measured or detected. Thus, the term rotor temperature sensor as used herein encompasses directly detecting rotor temperature, detecting rotor temperature indirectly, and estimating the rotor temperature.

Figure 2:
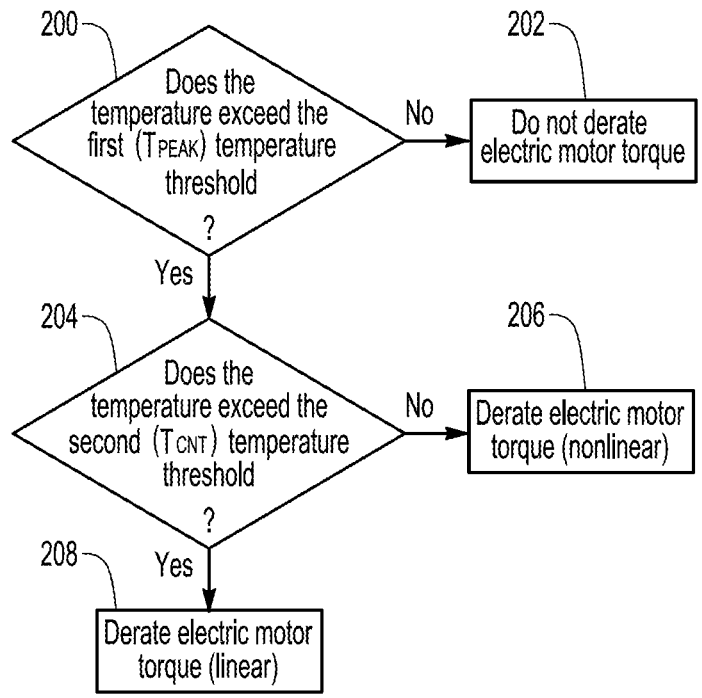
FIG. 2 is a flowchart of a method of control.

Referring to FIG. 2, a flowchart of a method of controlling a drive axle system is shown. As will be appreciated by one of ordinary skill in the art, the flowchart may represent control logic that may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 100 and may be implemented as a closed loop control system.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 3:
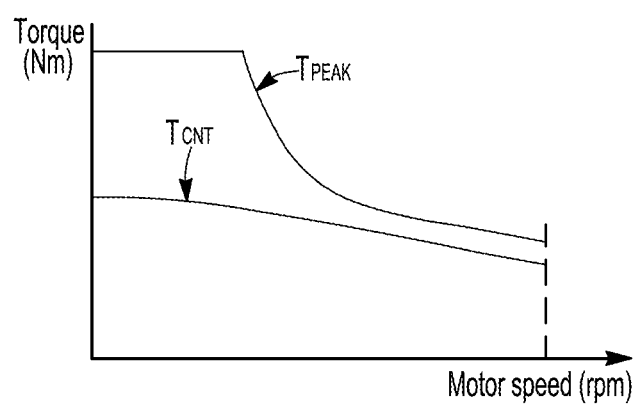
FIG. 3 is a graph of an example of torque limits associated with an electric motor of the drive axle system.

As an overview, an electric motor can provide a continuous torque and a peak torque. This is best understood with reference to the graph in FIG. 3, which shows an example of continuous torque and peak torque that can be provided by the electric motor 46 at different electric motor speeds.

The continuous torque, which may also be referred to as the continuously available torque, is designated $T_{CNT}$. The continuous torque line represents the maximum amount of torque that can be continuously provided by the electric motor 46. As such, the continuously available torque represents the highest amount of torque that the electric motor 46 can produce at a given speed for a long duration or an indefinite period of time. The continuous torque that is available decreases gradually as the speed of the electric motor 46 increases.

The peak torque, which may also be referred to as the peak available torque or temporary torque, is designated $T_{PEAK}$. The peak torque line represents the maximum amount of torque that can be provided by the electric motor 46. As such, the peak available torque represents the highest amount of torque that the electric motor 46 can produce at a given speed for a short duration or a limited period of time, which may typically be less than one second and may be measured in milliseconds. The peak torque may not be constant at all motor speeds. For instance, the peak torque may be constant at low electric motor speeds and may then decrease at higher electric motor speeds after reaching an inflection point. The peak torque is greater than the continuous torque. However, the peak torque can only be provided for relatively short periods of time because providing the peak torque may increase the temperature of the inverter 80, the stator 90 of the electric motor 46, the rotor 92 of the electric motor 46, or combinations thereof. Increased temperature of one or more of these components may reduce or affect the electric motor output torque that can be provided.

Figure 4:
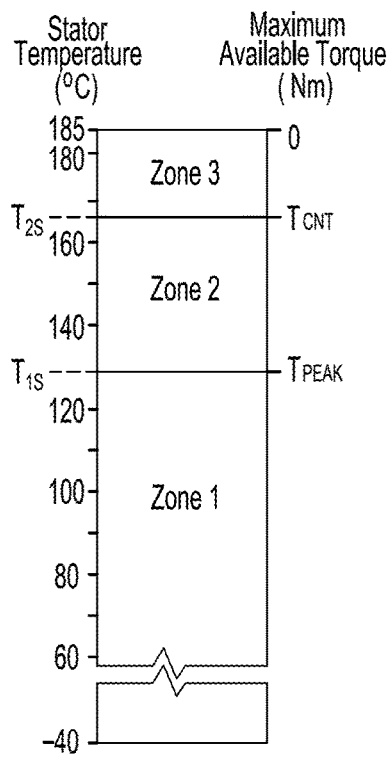
FIG. 4 is a diagram showing an example of temperature and available torque relationships associated with a stator of the electric motor.
Figure 5:
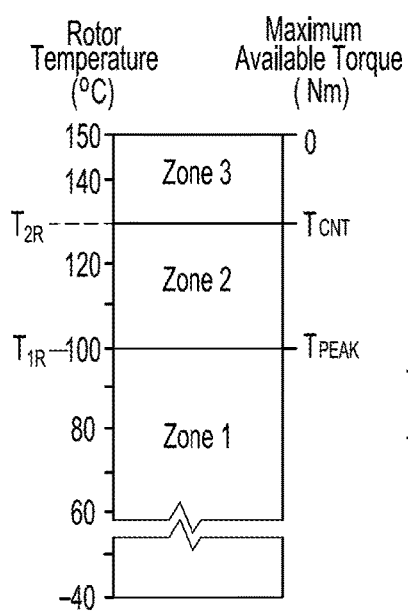
FIG. 5 is a diagram showing an example of temperature and available torque relationships associated with a rotor of the electric motor.
Figure 6:
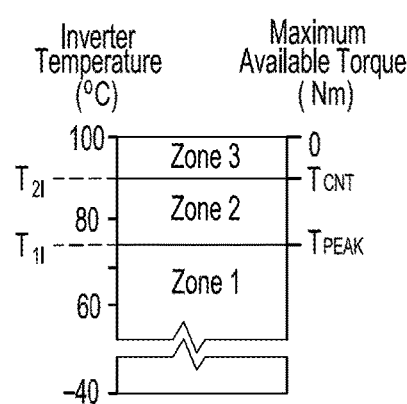
FIG. 6 is a diagram showing an example of temperature and available torque relationships associated with an inverter that may be provided with the drive axle system.

Referring to FIGS. 4-6, diagrams are shown that depict examples of relationships between temperature and the maximum available torque that can be provided with the electric motor. These diagrams are provided to facilitate a better understanding of the method of control may limit the maximum available torque based on the temperature of the stator 90, the rotor 92, and the inverter 80. Each diagram is broken into three zones by two temperature thresholds. The temperature thresholds discussed below are examples and may differ from the specific temperature values used in the examples.

FIG. 4 shows an example of a relationship between the temperature of the stator 90, which is referred to as the stator temperature, and the maximum available torque. In this example, the maximum available torque that can be provided with the electric motor 46 is the peak available torque ($T_{PEAK}$) up to a first stator temperature threshold ($T_{1S}$). In this example, the first stator temperature threshold is 130° C. and the maximum available torque that can be provided with the electric motor 46 is the peak torque ($T_{PEAK}$) when the stator temperature does not exceed 130° C. The operating zone in which the stator temperature is less than or equal to the first stator temperature threshold ($T_{1S}$) is referred to as zone 1. Thus, the maximum available torque that can be provided with the electric motor 46 is the peak torque ($T_{PEAK}$) throughout zone 1.

Zone 2 is adjacent to Zone 1. Zone 2 is bounded by the first stator temperature threshold ($T_{1S}$) and second stator temperature threshold ($T_{2S}$) that is greater than the first stator temperature threshold ($T_{1S}$). More specifically, the stator temperature exceeds the first stator temperature threshold ($T_{1S}$) but does not exceed the second stator temperature threshold ($T_{2S}$) in zone 2. In the example shown in FIG. 4, the second stator temperature threshold is 165° C.

The maximum available torque that can be provided with the electric motor 46 is less in zone 2 as compared to zone 1. The maximum available torque that can be provided with the electric motor 46 is the peak torque ($T_{PEAK}$) at the first stator temperature threshold ($T_{1S}$) and is the continuous torque ($T_{CNT}$) at the second stator temperature threshold ($T_{2S}$). Thus, maximum available torque that can be provided with the electric motor 46 decreases as the stator temperature increases in zone 2. Moreover, the maximum available torque may change in a nonlinear manner in zone 2. For instance, the maximum available torque may decrease in a nonlinear manner in zone 2 as the stator temperature increases or decreases.

Zone 3 is adjacent to Zone 2. Zone 3 is bounded by the second stator temperature threshold ($T_{2S}$) and by a maximum operating temperature of the stator 90 or maximum stator operating temperature, which is 185° C. in this example. Thus, the stator temperature exceeds the second stator temperature threshold ($T_{2S}$) in zone 3.

The maximum available torque that can be provided with the electric motor 46 is less in zone 3 as compared to zone 2. The maximum available torque that can be provided with the electric motor 46 is the continuous torque ($T_{CNT}$) at the second stator temperature threshold ($T_{2S}$) and is zero at the maximum stator operating temperature. Thus, maximum available torque that can be provided with the electric motor 46 decreases as the stator temperature increases in zone 3. Moreover, the maximum available torque may change in a linear manner in zone 3. For instance, the maximum available torque may decrease in a linear manner in zone 3 as the stator temperature increases and may increase in a linear manner in zone 3 as the stator temperature decreases.

FIG. 5 shows an example of a relationship between the temperature of the rotor 92, which is referred to as the rotor temperature, and the maximum available torque. In this example, the maximum available torque that can be provided with the electric motor 46 is the peak available torque ($T_{PEAK}$) up to a first rotor temperature threshold ($T_{1R}$). In this example, the first rotor temperature threshold is 100° C. and the maximum available torque that can be provided with the electric motor 46 is the peak torque when the rotor temperature does not exceed 100° C. The operating zone in which the rotor temperature is less than or equal to the first rotor temperature threshold ($T_{1R}$) is referred to as zone 1. Thus, the maximum available torque that can be provided with the electric motor 46 is the peak torque ($T_{PEAK}$) throughout zone 1.

Zone 2 is adjacent to Zone 1. Zone 2 is bounded by the first rotor temperature threshold ($T_{1R}$) and second rotor temperature threshold ($T_{2R}$) that is greater than the first rotor temperature threshold ($T_{1R}$). More specifically, the rotor temperature exceeds the first rotor temperature threshold ($T_{1R}$) but does not exceed the second rotor temperature threshold ($T_{2R}$) in zone 2. In the example shown in FIG. 5, the second rotor temperature threshold is 130° C. Comparing FIGS. 4 and 5, the first rotor temperature threshold ($T_{1R}$) may be less than the first stator temperature threshold ($T_{1S}$). The first stator temperature threshold ($T_{1S}$) may be greater than or equal to the second rotor temperature threshold ($T_{2R}$). The second stator temperature threshold ($T_{2S}$) may be greater than the second rotor temperature threshold ($T_{2R}$).

The maximum available torque that can be provided with the electric motor 46 is less in zone 2 as compared to zone 1. The maximum available torque that can be provided with the electric motor 46 is the peak torque ($T_{PEAK}$) at the first rotor temperature threshold ($T_{1R}$) and is the continuous torque ($T_{CNT}$) at the second rotor temperature threshold ($T_{2R}$). Thus, maximum available torque that can be provided with the electric motor 46 decreases as the rotor temperature increases in zone 2. Moreover, the maximum available torque may change in a nonlinear manner in zone 2. For instance, the maximum available torque may decrease in a nonlinear manner in zone 2 as the rotor temperature increases and may increase in a nonlinear manner in zone 2 as the rotor temperature decreases.

Zone 3 is adjacent to Zone 2. Zone 3 is bounded by the second rotor temperature threshold ($T_{2R}$) and by a maximum operating temperature of the rotor 92 or maximum rotor operating temperature, which is 150° C. in this example. Thus, the rotor temperature exceeds the second rotor temperature threshold ($T_{2R}$) in zone 3.

The maximum available torque that can be provided with the electric motor 46 is less in zone 3 as compared to zone 2. The maximum available torque that can be provided with the electric motor 46 is the continuous torque ($T_{CNT}$) at the second rotor temperature threshold ($T_{2R}$) and is zero at the maximum rotor operating temperature. Thus, maximum available torque that can be provided with the electric motor 46 decreases as the rotor temperature increases in zone 3. Moreover, the maximum available torque may change in a linear manner in zone 3. For instance, the maximum available torque may decrease in a linear manner in zone 3 as the rotor temperature increases or decreases.

FIG. 6 shows an example of a relationship between the temperature of the inverter 80, which is referred to as the inverter temperature, and the maximum available torque. In this example, the maximum available torque that can be provided with the electric motor 46 is the peak available torque ($T_{PEAK}$) up to a first inverter temperature threshold ($T_{1I}$). In this example, the first inverter temperature threshold is 75° C. and the maximum available torque that can be provided with the electric motor 46 is the peak torque when the inverter temperature does not exceed 75° C. The operating zone in which the inverter temperature is less than or equal to the first inverter temperature threshold ($T_{1I}$) is referred to as zone 1. Thus, the maximum available torque that can be provided with the electric motor 46 is the peak torque ($T_{PEAK}$) throughout zone 1.

Zone 2 is adjacent to Zone 1. Zone 2 is bounded by the first inverter temperature threshold ($T_{1I}$) and second inverter temperature threshold ($T_{2I}$) that is greater than the first inverter temperature threshold ($T_{1I}$). More specifically, the inverter temperature exceeds the first inverter temperature threshold ($T_{1I}$) but does not exceed the second inverter temperature threshold ($T_{2I}$) in zone 2. In the example shown in FIG. 6, the second inverter temperature threshold is 90° C. Comparing FIGS. 5 and 6, the first inverter temperature threshold ($T_{1I}$) may be less than the first rotor temperature threshold ($T_{1R}$). The second rotor temperature threshold ($T_{2R}$) may be greater than the second inverter temperature threshold ($T_{2I}$). The first rotor temperature threshold ($T_{1R}$) may be greater than or equal to the second inverter temperature threshold ($T_{2I}$).

The maximum available torque that can be provided with the electric motor 46 is less in zone 2 as compared to zone 1. The maximum available torque that can be provided with the electric motor 46 is the peak torque ($T_{PEAK}$) at the first inverter temperature threshold ($T_{1I}$) and is the continuous torque ($T_{CNT}$) at the second inverter temperature threshold ($T_{2I}$). Thus, maximum available torque that can be provided with the electric motor 46 decreases as the inverter temperature increases in zone 2. Moreover, the maximum available torque may change in a nonlinear manner in zone 2. For instance, the maximum available torque may decrease in a nonlinear manner in zone 2 as the inverter temperature increases and may increase in a nonlinear manner in zone 2 as the inverter temperature decreases.

Zone 3 is adjacent to Zone 2. Zone 3 is bounded by the second inverter temperature threshold ($T_{2I}$) and by a maximum operating temperature of the inverter 80 or maximum inverter operating temperature, which is 100° C. in this example. Thus, the inverter temperature exceeds the second inverter temperature threshold ($T_{2I}$) in zone 3.

The maximum available torque that can be provided with the electric motor 46 is less in zone 3 as compared to zone 2. The maximum available torque that can be provided with the electric motor 46 is the continuous torque ($T_{CNT}$) at the second inverter temperature threshold ($T_{2I}$) and is zero at the maximum inverter operating temperature. Thus, maximum available torque that can be provided with the electric motor 46 decreases as the inverter temperature increases in zone 3. Moreover, the maximum available torque may change in a linear manner in zone 3. For instance, the maximum available torque may decrease in a linear manner in zone 3 as the inverter temperature increases or decreases.

Referring again to FIG. 2, a method of control will now be described in more detail. The method of control may limit the maximum available torque based on the temperature of the stator 90, rotor, 92, and the inverter 80 as previously mentioned.

At block 200, the method may determine whether the temperature exceeds a first temperature threshold. More specifically, the method may determine whether the stator temperature exceeds the first stator temperature threshold ($T_{1S}$), whether the rotor temperature exceeds the first rotor temperature threshold ($T_{1R}$), and whether the inverter temperature exceeds the first inverter temperature threshold ($T_{1I}$). If the stator temperature does not exceed the first stator temperature threshold ($T_{1S}$), the rotor temperature does not exceed the first rotor temperature threshold ($T_{1R}$), and the inverter temperature does not exceed the first inverter temperature threshold ($T_{1I}$), then the stator 90, the rotor 92, and the inverter 80 are all operating in zone 1 and the method may continue at block 202. If the stator temperature exceeds the first stator temperature threshold ($T_{1S}$), the rotor temperature exceeds the first rotor temperature threshold ($T_{1R}$), the inverter temperature exceeds the first inverter temperature threshold ($T_{1I}$), or combinations thereof, then at least one of the stator 90, the rotor 92, and the inverter 80, is not operating in zone 1 and the method may continue at block 204.

At block 202, the electric motor torque is not derated. The stator 90, the rotor 92, and the inverter 80 are all operating in zone 1 at block 202. As such, torque can be provided up to peak available torque ($T_{PEAK}$) or up to the operating limits of the electric motor 46. Thus, the peak available torque ($T_{PEAK}$) and the continuous torque ($T_{CNT}$) are not derated or reduced to accommodate an elevated temperature of at least one of the stator 90, the rotor 92, and the inverter 80. The torque command may not be derated or limited by the controller to attempt to avoid further temperature increases of the stator 90, the rotor 92, or the inverter 80 and the electric motor may be operated to provide torque to a wheel assembly 24 based on the torque command.

At block 204, the method may determine whether the temperature exceeds a second temperature threshold. More specifically, the method may determine whether the stator temperature exceeds the second stator temperature threshold ($T_{2S}$), whether the rotor temperature exceeds the second rotor temperature threshold ($T_{2R}$), and whether the inverter temperature exceeds the second inverter temperature threshold ($T_{2I}$). If the stator temperature does not exceed the second stator temperature threshold ($T_{2S}$), the rotor temperature does not exceed the second rotor temperature threshold ($T_{2R}$), and the inverter temperature does not exceed the second inverter temperature threshold ($T_{2I}$), then (a) at least one of the stator 90, the rotor 92, and the inverter 80 is operating in zone 2 and (b) none of the stator 90, the rotor 92, and the inverter 80 are operating in zone 3, and the method may continue at block 206. If the stator temperature exceeds the second stator temperature threshold ($T_{2S}$), the rotor temperature exceeds the second rotor temperature threshold ($T_{2R}$), the inverter temperature exceeds the second inverter temperature threshold ($T_{2I}$), or combinations thereof, then at least one of the stator 90, the rotor 92, and the inverter 80, is operating in zone 3 and the method may continue at block 208.

At block 206, the peak available torque ($T_{PEAK}$) and the continuous torque ($T_{CNT}$) are derated. Derating is based on the stator temperature, the rotor temperature, and the inverter temperature. For instance, the stator temperature, the rotor temperature, and the inverter temperature may be used to reference a corresponding derating value from an array of derating values that are stored in a lookup table. The lookup table may be populated with derating values based on vehicle development testing or drive axle system development testing. The derating value may be expressed as a percentage. For example, the derating value obtained from the lookup table may be expressed as a percentage, such as 15%. This derating value may be applied to the peak available torque and the continuous torque to derate or limit the peak available torque and the continuous torque (e.g., the peak available torque may be reduced by 15% and the continuous torque may be reduced by 15%). The peak available torque and the continuous torque may be derated to attempt to avoid additional temperature increases that may result in one or more of the stator 90, the rotor 92, and the inverter 80 from increasing in temperature and potentially moving from zone 2 the zone 3 and hopefully to allow the temperature of one or more of the stator 90, the rotor 92, and the inverter 80 to decrease in temperature and potentially move from zone 2 to zone 1. Thus, the torque command is derated (e.g., capped, limited) so as not to exceed the derated peak available torque (e.g., the peak available torque reduced by 15%) or the derated continuous torque (e.g., the continuous torque reduced by 15%) to attempt to avoid further temperature increases of the stator 90, the rotor 92, or the inverter 80. Derating may result in providing less torque than requested by the vehicle driver and thus less torque than the torque request associated with the torque request signal from the accelerator pedal position sensor 110. The electric motor 46 may be operated to provide torque to a wheel assembly 24 based on the torque command.

Figure 7:
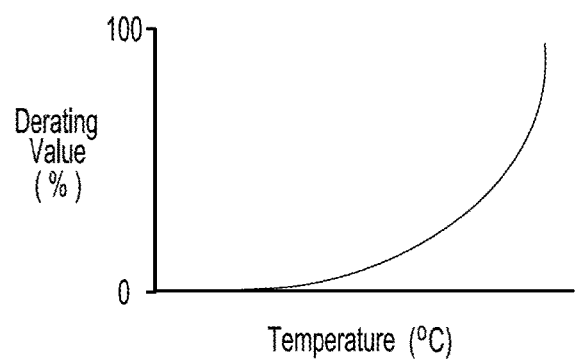
FIG. 7 is a graph showing an example of nonlinear derating values.

Derating may occur in a nonlinear manner in zone 2. More specifically, a nonlinear relationship between the derating value and the temperature of the stator 90, the rotor 92, inverter 80, or combinations thereof. This is best understood with reference to FIG. 7. FIG. 7 shows a graph that illustrates an example of derating values expressed as percentages plotted with respect to stator temperature. The derating value may be expressed as a percentage from 0% to 100%. As the stator temperature increases, the derating value expressed as a percentage also increases. However this increase may occur in a nonlinear manner, thereby resulting in a derating curve or derating values that increase in a nonlinear manner as the stator temperature increases. Similar plots of derating values may also be provided based on rotor temperature and inverter temperature.

At block 208, the peak available torque ($T_{PEAK}$) and the continuous torque ($T_{CNT}$) are derated. Derating is based on the stator temperature, the rotor temperature, and the inverter temperature. For instance, the stator temperature, the rotor temperature, and the inverter temperature may be used to reference a corresponding derating value that is stored in a lookup table. The lookup table may be populated with an array of derating values based on vehicle development testing or drive axle system development testing. The derating value may be expressed as a percentage. For example, the derating value obtained from the lookup table may be expressed as a percentage, such as 50%. This derating value may be applied to the peak available torque and the continuous torque to derate or limit the peak available torque and the continuous torque (e.g., the peak available torque may be reduced by 50% and the continuous torque may be reduced by 50%). The peak available torque and the continuous torque may be derated to attempt to avoid additional temperature increases that may further reduce the maximum available torque that can be provided or result in one or more of the stator 90, the rotor 92, and the inverter 80 from increasing in temperature and potentially reaching its maximum operating temperature, at which point no torque can be provided. The magnitude or amount of derating when in zone 3 may be greater than that in zone 2 to help avoid further temperature increases and to increase the likelihood that the temperature of one or more of the stator 90, the rotor 92, and the inverter 80 decreases in temperature and moves from zone 3 to zone 2. Thus, the torque command is derated or capped so as not to exceed the derated peak available torque (e.g., the peak available torque reduced by 50%) or the derated continuous torque (e.g., the continuous torque reduced by 50%) to attempt to avoid further temperature increases of the stator 90, the rotor 92, or the inverter 80. Derating may result in providing less torque than requested by the vehicle driver and thus less torque than the torque request associated with the torque request signal from the accelerator pedal position sensor 110. The electric motor 46 may be operated to provide torque to a wheel assembly 24 based on the torque command. It is contemplated that the derated peak available torque in zone 3 cannot exceed the continuous torque.

Derating may occur in a linear manner in zone 3. More specifically, a linear relationship between the derating value and the temperature of the stator 90, the rotor 92, inverter 80, or combinations thereof. This can be visualized as a graph similar to FIG. 7 but with the derating values plotted along a straight line that increases as temperature increases. The derating value may be expressed as a percentage from 0% to 100%.

A drive axle system and method of control as discussed above may help proactively address elevated temperatures of a stator, a rotor, and inverter, or combinations thereof, by derating or limiting the continuous torque and the peak torque that can be provided by the electric motor, thereby helping avoid, reduce, or reverse further temperature increases, which may help avoid component overheating and reduced component life. The present invention accounts for the temperatures of the stator, rotor, and inverter concurrently, which may provide more comprehensive temperature assessments and may avoid situations in which the electric motor is operated in a manner that unintentionally leads to reduction in the available electric motor torque that could have been avoided. In addition, the present invention may allow a more aggressive derating response to be provided at higher temperature levels, such as zone 3, to help reduce the temperature of the stator, rotor, and/or inverter, thereby leading to a reduction in the derating that is applied and helping avoid or alleviate situations in which the desired level of output torque cannot be provided, thereby help improving vehicle drivability and responsiveness.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of controlling a drive axle system, the method comprising:
   determining an inverter temperature of an inverter of the drive axle system, a stator temperature of a stator of an electric motor of the drive axle system, and a rotor temperature of a rotor of the electric motor;
   determining a torque command based on the inverter temperature, the stator temperature, and the rotor temperature; and
   operating the electric motor to provide torque to a wheel of the drive axle system based on the torque command, wherein determining the torque command includes limiting a peak torque and a continuous torque that is providable with the electric motor when the inverter temperature exceeds a first inverter temperature threshold, the stator temperature exceeds a first stator temperature threshold, or the rotor temperature exceeds a first rotor temperature threshold.

2. The method of claim 1 wherein the first stator temperature threshold is greater than the first rotor temperature threshold and the first rotor temperature threshold is greater than the first inverter temperature threshold.

3. The method of claim 1 wherein limiting the peak torque and the continuous torque includes determining a derating value based on the inverter temperature, the stator temperature, and the rotor temperature and derating the peak torque and the continuous torque based on the derating value.

4. The method of claim 3 wherein the peak torque and the continuous torque are derated nonlinearly as the inverter temperature increases when the inverter temperature exceeds the first inverter temperature threshold and does not exceed a second inverter temperature threshold.

5. The method of claim 3 wherein the peak torque and the continuous torque are derated nonlinearly as the stator temperature increases when the stator temperature exceeds the first stator temperature threshold and does not exceed a second stator temperature threshold.

6. The method of claim 3 wherein the peak torque and the continuous torque are derated nonlinearly as the rotor temperature increases when the rotor temperature exceeds the first rotor temperature threshold and does not exceed a second rotor temperature threshold.

7. The method of claim 3 wherein the peak torque and the continuous torque are derated nonlinearly as the inverter temperature increases when the inverter temperature exceeds the first inverter temperature threshold and does not exceed a second inverter temperature threshold, the peak torque and the continuous torque are derated nonlinearly as the stator temperature increases when the stator temperature exceeds the first stator temperature threshold and does not exceed a second stator temperature threshold, and the peak torque and the continuous torque are derated nonlinearly as the rotor temperature increases when the rotor temperature exceeds the first rotor temperature threshold and does not exceed a second rotor temperature threshold.

8. The method of claim 7 wherein the second stator temperature threshold is greater than the second rotor temperature threshold and the second rotor temperature threshold is greater than the second inverter temperature threshold.

9. The method of claim 7 wherein the first stator temperature threshold is greater than or equal to the second rotor temperature threshold and the first rotor temperature threshold is greater than or equal to the second inverter temperature threshold.

10. The method of claim 7 wherein a maximum available torque from the electric motor is the continuous torque when the inverter temperature is equal to the second inverter temperature threshold, the stator temperature is less than the second stator temperature threshold, and the rotor temperature is less than the second rotor temperature threshold.

11. The method of claim 7 wherein a maximum available torque from the electric motor is the continuous torque when the stator temperature is equal to the second stator temperature threshold, the inverter temperature is less than the second inverter temperature threshold, and the rotor temperature is less than the second rotor temperature threshold.

12. The method of claim 7 wherein a maximum available torque from the electric motor is the continuous torque when the rotor temperature is equal to the second rotor temperature threshold, the inverter temperature is less than the second inverter temperature threshold, and the stator temperature is less than the second stator temperature threshold.

13. The method of claim 7 wherein a maximum available torque from the electric motor is the peak torque when the inverter temperature is equal to the first inverter temperature threshold and is the continuous torque when the inverter temperature is equal to the second inverter temperature threshold, and the stator temperature is less than the second stator temperature threshold, and the rotor temperature is less than the second rotor temperature threshold.

14. The method of claim 7 wherein a maximum available torque from the electric motor is the peak torque when the stator temperature is equal to the first stator temperature threshold and is the continuous torque when the stator temperature is equal to the second stator temperature threshold, and the inverter temperature is less than the second inverter temperature threshold, and the rotor temperature is less than the second rotor temperature threshold.

15. The method of claim 7 wherein a maximum available torque from the electric motor is the peak torque when the rotor temperature is equal to the first rotor temperature threshold and is the continuous torque when the rotor temperature is equal to the second rotor temperature threshold, and the inverter temperature is less than the second inverter temperature threshold, and the stator temperature is less than the second stator temperature threshold.

16. A method of controlling a drive axle system, the method comprising:
   determining an inverter temperature of an inverter of the drive axle system, a stator temperature of a stator of an electric motor of the drive axle system, and a rotor temperature of a rotor of the electric motor;
   determining a torque command based on the inverter temperature, the stator temperature, and the rotor temperature; and
   operating the electric motor to provide torque to a wheel of the drive axle system based on the torque command, wherein determining the torque command includes not limiting a peak torque and a continuous torque that is providable with the electric motor when the inverter temperature does not exceed a first inverter temperature threshold, the stator temperature does not exceed a first stator temperature threshold, and the rotor temperature does not exceed a first rotor temperature threshold.

17. The method of claim 16 wherein determining the torque command includes limiting the peak torque and the continuous torque that is providable with the electric motor when the inverter temperature exceeds the first inverter temperature threshold, the stator temperature exceeds the first stator temperature threshold, or the rotor temperature exceeds the first rotor temperature threshold.

18. A drive axle system comprising:
an axle assembly that rotatably supports a wheel and that has an electric motor that is operatively connected to the wheel, the electric motor including a stator and a rotor that is rotatable with respect to the stator;
an electric power source that is electrically connected to the electric motor via an inverter; and
a control system that is configured to control torque that is provided to the wheel by the electric motor based on an inverter temperature of the inverter, a stator temperature of the stator, and a rotor temperature of the rotor, wherein the control system limits a peak torque and a continuous torque that is providable with the electric motor when the inverter temperature exceeds a first inverter temperature threshold, the stator temperature exceeds a first stator temperature threshold, or the rotor temperature exceeds a first rotor temperature threshold.

19. The drive axle system of claim 18 wherein the control system limits a maximum available torque that is providable with the electric motor to not exceed the continuous torque when the inverter temperature exceeds a second inverter temperature threshold, the stator temperature exceeds a second stator temperature threshold, or the rotor temperature exceeds a second rotor temperature threshold.

* * * * *